(12) United States Patent
Srivastava et al.

(10) Patent No.: US 9,319,359 B1
(45) Date of Patent: Apr. 19, 2016

(54) PROMOTING CONTENT IN A REAL-TIME MESSAGING PLATFORM

(71) Applicant: Twitter, Inc., San Francisco, CA (US)

(72) Inventors: Utkarsh Srivastava, Menlo Park, CA (US); Ashish Goel, San Francisco, CA (US); Srinivasan Rajgopal, Sunnyvale, CA (US); Anamitra Banerji, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/213,367

(22) Filed: Mar. 14, 2014

Related U.S. Application Data

(63) Continuation-in-part of application No. 13/975,515, filed on Aug. 26, 2013, which is a continuation of application No. 13/433,217, filed on Mar. 28, 2012, now Pat. No. 8,682,895.

(60) Provisional application No. 61/800,546, filed on Mar. 15, 2013, provisional application No. 61/470,385, filed on Mar. 31, 2011.

(51) Int. Cl.
| | |
|---|---|
| *G06F 17/30* | (2006.01) |
| *G06F 7/00* | (2006.01) |
| *H04L 12/58* | (2006.01) |
| *G06Q 10/10* | (2012.01) |

(52) U.S. Cl.
CPC .......... *H04L 51/04* (2013.01); *G06F 17/3087* (2013.01); *G06F 17/30979* (2013.01); *G06Q 10/109* (2013.01)

(58) Field of Classification Search
USPC ..................................................... 707/732
See application file for complete search history.

(56) References Cited

U.S. PATENT DOCUMENTS

| | | | |
|---|---|---|---|
| 6,546,378 B1 | 4/2003 | Cook | |
| 7,478,129 B1 | 1/2009 | Chemtob | |
| 7,624,125 B2 * | 11/2009 | Feinsmith | |
| 7,805,421 B2 * | 9/2010 | Grichnik et al. | 707/696 |
| 2002/0131565 A1 | 9/2002 | Scheuring et al. | |
| 2004/0054542 A1 | 3/2004 | Foote et al. | |
| 2005/0144075 A1 * | 6/2005 | Magowan et al. | 705/14 |

(Continued)

OTHER PUBLICATIONS

United States Office Action, U.S. Appl. No. 13/433,217, Mar. 21, 2013, 13 pages.

(Continued)

*Primary Examiner* — Kuen Lu
(74) *Attorney, Agent, or Firm* — Fenwick & West LLP

(57) ABSTRACT

A real-time messaging platform and method are disclosed which can be used to promote content in the messaging platform. In one embodiment, the promotion system is disclosed which performs initial candidate selection so as to narrow down the set of candidate promotions before applying more expensive processing. The candidate selection takes advantage of the connection graph information associated with accounts in the messaging platform to identify targeted accounts. In another embodiment, the promotion system uses a prediction model to predict a user's engagement with the promotion and utilizes the prediction to assist in ranking the candidate promotions. Promotions can be assigned metrics based, for example, on a weighted combination of user engagement rates, decayed with time to reflect an intuition that recent interactions by one or more users with the promotion will have a greater impact than older interactions with the promotion.

24 Claims, 11 Drawing Sheets

(56) References Cited

U.S. PATENT DOCUMENTS

2006/0101351 A1    5/2006   Cowham
2008/0235084 A1*   9/2008   Quoc et al. .................... 705/14
2009/0150214 A1*   6/2009   Mohan .......................... 705/10
2009/0307318 A1*   12/2009   Chappell et al. ............. 709/206
2011/0040751 A1*   2/2011   Chandrasekar et al. ...... 707/725

OTHER PUBLICATIONS

United States Office Action, U.S. Appl. No. 13/975,515, Sep. 17, 2014, 21 pages.
United States Office Action, U.S. Appl. No. 13/975,515, Mar. 3, 2015, 16 pages.

* cited by examiner

PROMOTING CONTENT IN A REAL-TIME MESSAGING PLATFORM

CROSS REFERENCE TO RELATED APPLICATIONS

This application claims the benefit of U.S. Provisional Application No. 61/800,546, filed Mar. 15, 2013, which is incorporated by reference in its entirety. This application is also a continuation-in-part of co-pending U.S. application Ser. No. 13/975,515, filed Aug. 26, 2013, which is a continuation of U.S. application Ser. No. 13/433,217, filed Mar. 28, 2012, which claims the benefit of U.S. Provisional Application No. 61/470,385, filed Mar. 31, 2011, all of which are incorporated by reference in their entirety.

BACKGROUND OF THE INVENTION

There are a wide range of known automatic techniques for classifying and selecting content for an Internet service. For example, with regard to textual content, there are known techniques from the areas of textual categorization, textual clustering, entity extraction, etc. that can be used to classify the different textual content. There are similar classification techniques for other types of content, such as audio and video. The classification result can then be used to determine what type of promoted content to associate with content in the Internet service. Such mechanisms have been used, for example, to insert content into a search engine page based on relevance to search keywords provided by a user.

SUMMARY OF THE INVENTION

A real-time messaging platform and method are disclosed which can be used to promote content in the messaging platform. In accordance with an embodiment of an aspect of the invention, a promotion system is disclosed which performs initial candidate selection so as to narrow down the set of candidate promotions before applying more expensive processing. The candidate selection takes advantage of the connection graph information associated with accounts in the messaging platform to identify targeted accounts. In another embodiment, the promotion system applies filtering to the candidate promotions, taking into account such factors as fatigue. In another embodiment, the promotion system uses a prediction model to predict a user's engagement with the promotion and utilizes the prediction to assist in ranking the candidate promotions, preferably using an auction model. Details of one or more embodiments are set forth in the accompanying drawings and description below.

DESCRIPTION OF DRAWINGS

Embodiments of the present invention are illustrated by way of example, and not by way of limitation, in the figures of the accompanying drawings and in which like reference numerals refer to similar elements.

DETAILED DESCRIPTION

Figure 1:
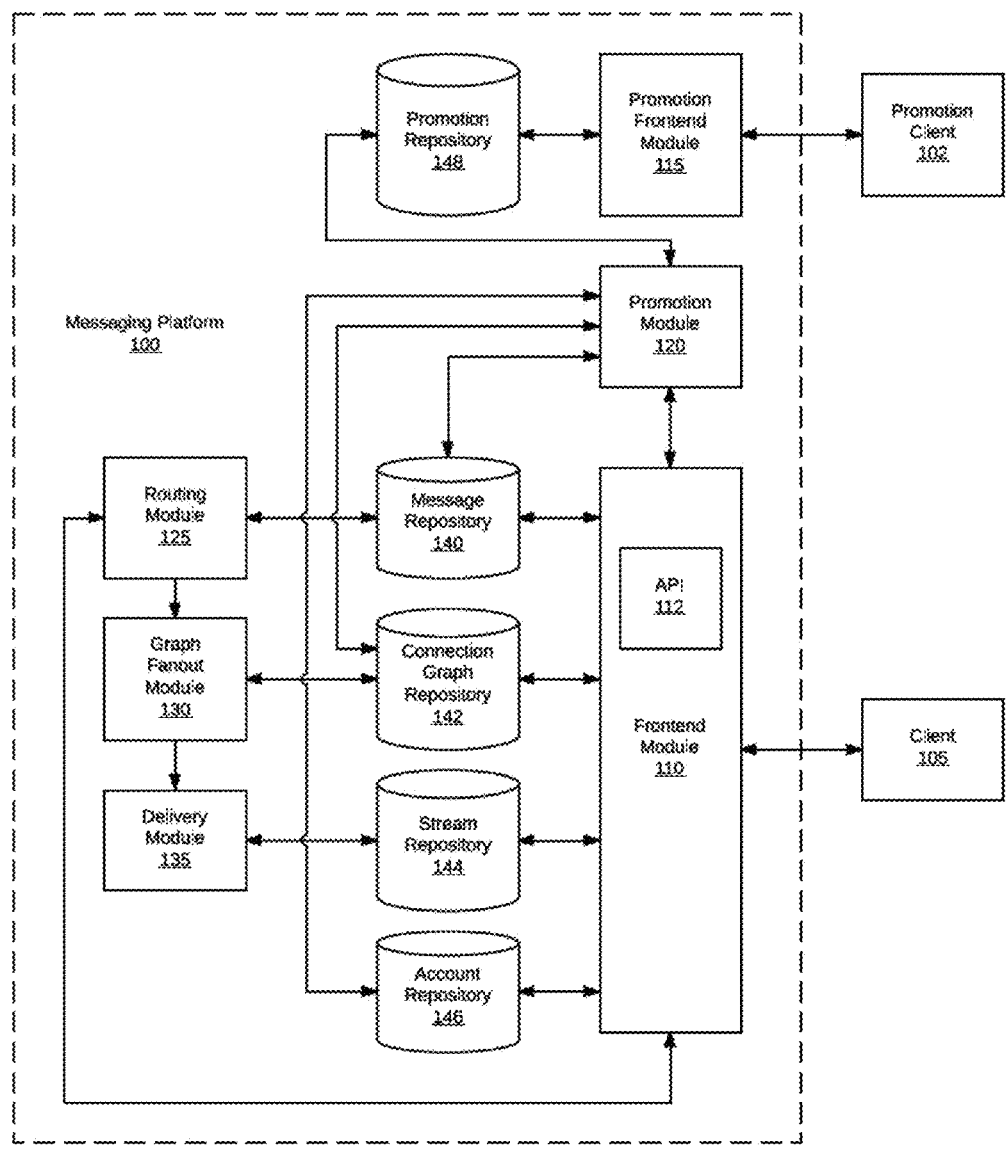
FIG. 1 is a diagram of a real-time messaging platform, suitable for use with an embodiment of the invention.

FIG. 1 is a diagram of a real-time messaging platform 100, suitable for use with an embodiment of the invention. The real-time messaging platform 100 includes a routing module 125, a graph fanout module 130, a delivery module 135, various repositories 140, 142, 144, 146 and a frontend module 110.

The messaging platform 100, as further described below, facilitates messaging from a set of accounts, each account having associated connection graph data. A user of the platform composes a message to be sent from an entry point. The entry point can be based on the operation of any computing device 105, for example, a mobile phone, a personal computer (laptop, desktop, or server), or a specialized appliance having communication capability. The entry point can utilize any of a number of advantageous interfaces, including a web-based client, a Short Messaging Service (SMS) interface, an instant messaging interface, an email-based interface, an API function-based interface, etc. In a preferred embodiment, the message includes text, such as a 140 character Tweet, although the message can include text, graphics, video, or other content and can include links to such content. The message can be in reply to another message, as identified for example in metadata associated with the message. The message can be a reposting of another user's message, referred to as a "Retweet", as identified for example in metadata associated with the message. The message can include symbols, such as a hashtag, to denote an arbitrary keyword or topic that can aid in categorizing messages. The message can be transmitted through a communication network to the messaging platform 100.

The routing module 125 in the messaging platform 100 receives the message and proceeds to store the message in a message repository 140. The message is assigned an identifier. The sender of the message is passed to a graph fanout module 130. The graph fanout module 130 is responsible for retrieving account graph data from the connection graph repository 142 and using the account graph data to determine which accounts in the messaging platform 100 should receive the message. The account graph data, for example, can reflect which accounts in the messaging platform are "following" a particular account and are, therefore, subscribed to receive messages from the particular account. The account graph data can reflect more sophisticated graph relationships between the accounts. The delivery module 135 takes the list of accounts from the fanout module 130 and the message identifier generated by the routing module 125 and proceeds to insert the message identifier into message stream data associated with each identified account and stored in the stream repository 144. The message streams stored in the stream repository 144 can be a "timeline" of messages associated with the account or can reflect any arbitrary organization of the messages that is advantageous for the user of the account on the messaging platform 100.

The frontend module 110 uses the storage repositories 140, 142, 144, 146 to construct message streams for serving to a user of the account on the messaging platform 100. As with the entry point, a user can use any end point 105 to receive the messages. The end point 105 can also be any computing device providing any of a number of advantageous interfaces. For example, where the user uses a web-based client to access their messages, a web interface module in the front end 110 can be used to construct the message streams and serve the streams to the user. Where the user uses a client that accesses the messaging platform 100 through an API, an API interface module 112 can be utilized to construct the message streams and serve the streams to the client 105 for presentation to the user. Similarly, different forms of message delivery can be handled by different modules in the front end 110. The user can specify particular receipt preferences which are implemented by the modules in the front end 110. The user can also interact with the messages in the stream in a number of ways, including without limitation, by clicking/selecting a message (for more details or information regarding the message), clicking/selecting a link or hashtag in a message, by reposting the message, by favoriting the message, etc. The messaging platform 100 can provide, through the front end 110, recommendations on accounts to follow, as part of the user interface provided to the client 105. Also, the messaging platform 100 can also analyze the message streams and identify trends. The trends can be represented as a list of textual items, including trending hashtags.

Illustrating an embodiment of an aspect of the invention, the messaging platform 100 includes a promotion system that comprises a promotion module 120, a promotion frontend module 115, and a promotion repository 148.

A user or entity, referred to herein as the promoter, preferably can use a client 102 to specify a promotion. Alternatively, the promoter provides the same information manually and the information is input into the system using a client 102 on behalf of the promoter. As above, the client 102 can be based on the operation of any computing device, for example, a mobile phone, a personal computer (laptop, desktop, or server), or a specialized appliance having communication capability. The promotion client 102 can utilize any of a number of advantageous interfaces, including a web-based client, a Short Messaging Service (SMS) interface, an instant messaging interface, an email-based interface, an API function-based interface, etc. The promotion client 102 communicates through a communication network with the promotion frontend module 115. The promoter can utilize the promotion client 102 to input a promotion into the messaging platform 100. As an example, and without limitation, the promoter can choose to promote one or more accounts in the messaging platform 100. Alternatively, the promoter can choose to promote one or more messages (or a portion of one or more messages) in the messaging platform 100. Alternatively, where the messaging platform provides a service that displays trends in the messaging platform 100, the promoter can choose to promote trends in the messaging platform 100. As a part of the promotion, the promoter can provide additional information, such as a bid and budget where an auction model is utilized to select promotions as further described herein. Information associated with a particular promotion specified by a promoter can be stored in the promotion repository 148.

The promotion module 120 selects promoted content for presentation on the messaging platform 100. The promotion module 120 determines what promotion to display by accessing information in one or more of the message repository 140, the connection graph repository 142, the stream repository 144, the account repository 146, and the promotion repository 148. A user, utilizing client 105, issues a request to the frontend module 110 of the messaging platform 100. The request can be for a stream, such as a timeline, of messages. The request can be a search request and include one or more search keywords. The frontend module 110 processes the request, which may entail contacting other modules or services, such as a search module, not depicted in FIG. 1. The frontend module 110 also issues a request to the promotion module 120 for promoted content. Where the initial client request is a search request, the frontend module 120 passes the search keywords to the promotion module 120 so that the promotion module 120 can identify and return promoted content associated with the search keywords. Where the initial client request is not a search request, the promotion module 120 performs processing that is further described herein to identify and return promoted content to the frontend module 120. The frontend module 110 incorporates the promoted content in the information provided back to the client 105. For example, where the promoted content is a promoted account, the client 105 can receive accounts suggested for the user, including the promoted account. Where the promoted content is a promoted message, the client 105 receives a stream of messages which includes the promoted message inserted in the stream of messages. Where the promoted content is a promoted trend, the client 105 receives a promoted trend included with the trends presented as part of the service on the messaging platform 100. The promoted content displayed on the client 105 can include an identifier and means for reporting the impression and any engagement with the promoted content back to the messaging platform 100.

Figure 2:
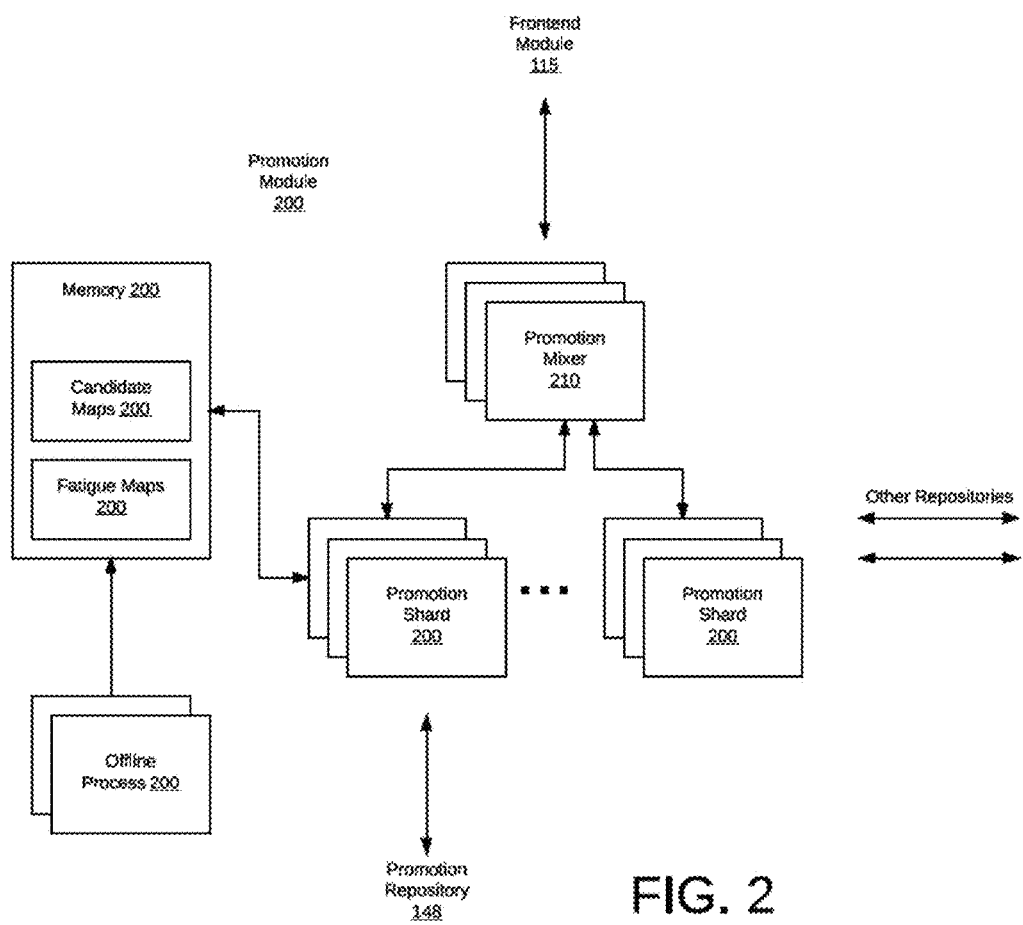
FIG. 2 is a diagram illustrating an embodiment of a promotion module, illustrating an embodiment of an aspect of the invention.

FIG. 2 is a diagram illustrating an embodiment of the promotion module 120, illustrating an embodiment of an aspect of the invention. The processing performed by the promotion module 120 is preferably divided into one or more modules. As depicted in FIG. 2, the processing performed by the promotion module 120 is divided into multiple promotion shards 220 which are in communication with a promotion mixer 210, which is responsible for combining the results from the multiple promotion shards 220 into a response provided back to the frontend module 115.

In one embodiment, the promotion module 120 maintains one or more data structures stored in memory 240 or some other form of repository. In one embodiment, the promotion module 120 maintains one or more candidate maps 250 for rapid selection of candidate promotions before applying more expensive processing. In another embodiment, the promotion module 120 maintains one or more fatigue maps 260 for keeping track of previous promotions in order to determine whether to present another promotion. The maps can be generated by an offline process 280. The maps can be stored in a high performance memory object caching system, such as memcache. The processing performed to generate and utilize the candidate maps 250 and the fatigue maps 260 is further described herein.

Figure 3:
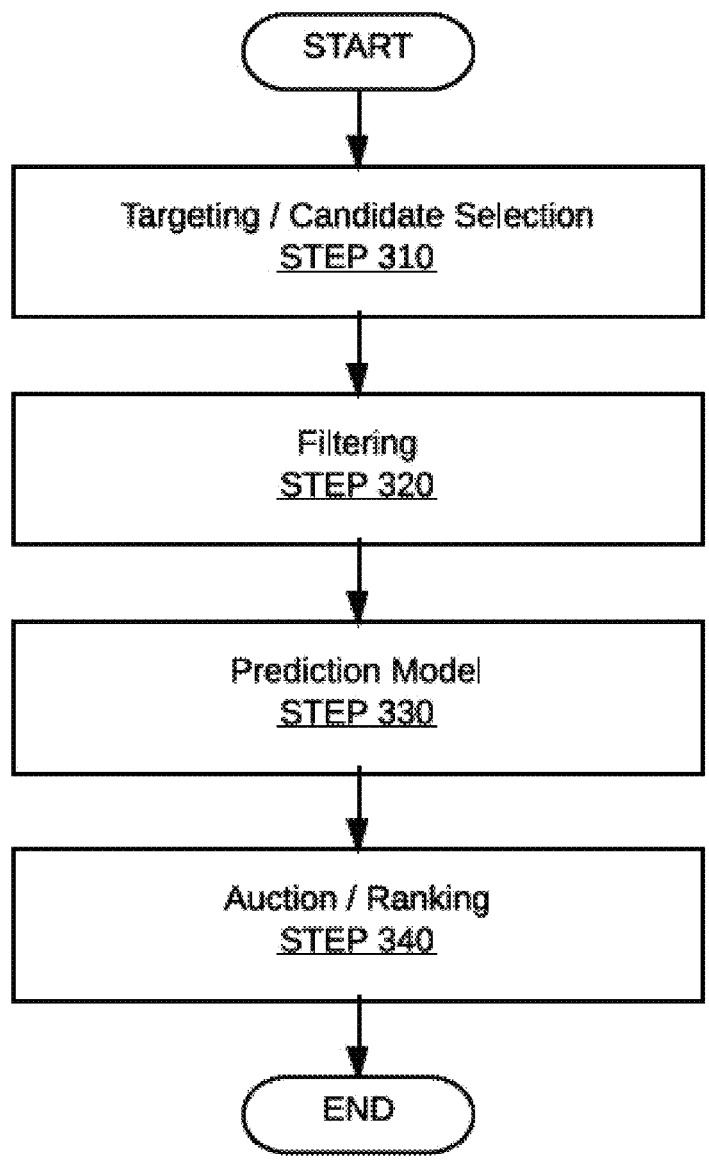
FIG. 3 is a flowchart of processing performed by the promotion module in accordance with an embodiment of an aspect of the invention.

FIG. 3 is a flowchart of processing performed by the promotion module 120 in accordance with an embodiment of an aspect of the invention. The promotion module 120 receives a request from the frontend module 110 for one or more promotions. The promotion module 120 performs the processing in FIG. 3 so as to match an active promotion against an account of a user who may be interested in or engage with the promotion. At step 310, the promotion module 120 performs initial candidate selection or targeting so as to narrow down the set of candidate promotions before applying more expensive processing. The details regarding the different types of candidate selection, in accordance with different embodiments of different aspects of the invention, are described below. At step 320, the promotion module 120 applies filtering to the candidate promotions. The details regarding different embodiments of filtering are described below. At step 330, the promotion module 120 generates a prediction model score, based, for example, on a model of a user's engagement with the promotion. The details regarding different embodiments of a prediction model score are described below. At step 340, the promotion module 120 ranks the promotions, at least in part using the prediction model scores. The promotion module 120 preferably uses an auction model to select the set of promotions to provide back to the frontend module 110. The details regarding different embodiments of the ranking/auction processing are described below.

At step 310 in FIG. 3, the promotion module 120 performs initial candidate selection or targeting. In accordance with different embodiments of different aspects of the invention, the promotion module 120 can utilize any of a number of different targeting techniques.

In one embodiment, where the promotion module 120 receives a request from the frontend module 110 for promoted content associated with a search request, the promotion module 120 receives and processes the one or more search keywords associated with the search request. The promotion module 120, in one embodiment, maintains a candidate map between keywords and promoted content. The promotion module 120 can generate the candidate map by accessing the promotion repository 148 and constructing the candidate map from promotion campaign entries in the repository. The promotion module 120 can store the candidate map in memory for rapid lookup. After receiving the search keywords from the frontend module 110, the promotion module 120 can lookup the search keywords in the candidate map and rapidly identify candidate promotions to associate with the search results.

It can be advantageous to process the keywords, for example, by processing keyword criteria into lower-case characters, tokenizing the keyword criteria, removing stop words, and using stemming. The promotion server 120 can construct the candidate map so as to facilitate a reverse index lookup of the longest criteria word. The use of longest criteria word helps restrict retrievals to small set of candidates, on which containment queries can be performed.

In one embodiment, the promotion module 120 uses a form of implicit targeting to select candidate promotions. The promotion account, in accordance with the connection graph, will have an existing follower base, F. Given the set of accounts on the messaging platform 100, it is possible to cluster the remaining accounts on various notions of similarity to generate a set of lookalikes of F, denoted L(F), which is distinct from F (that is, accounts in F are not in L(F)). For example, the similarity of accounts can be based on whether the accounts follow similar accounts, or it can be based on whether the accounts engage with similar messages. Given the new set of accounts L(F), it is possible to target promoted content at F or L(F) or both.

Figure 4:
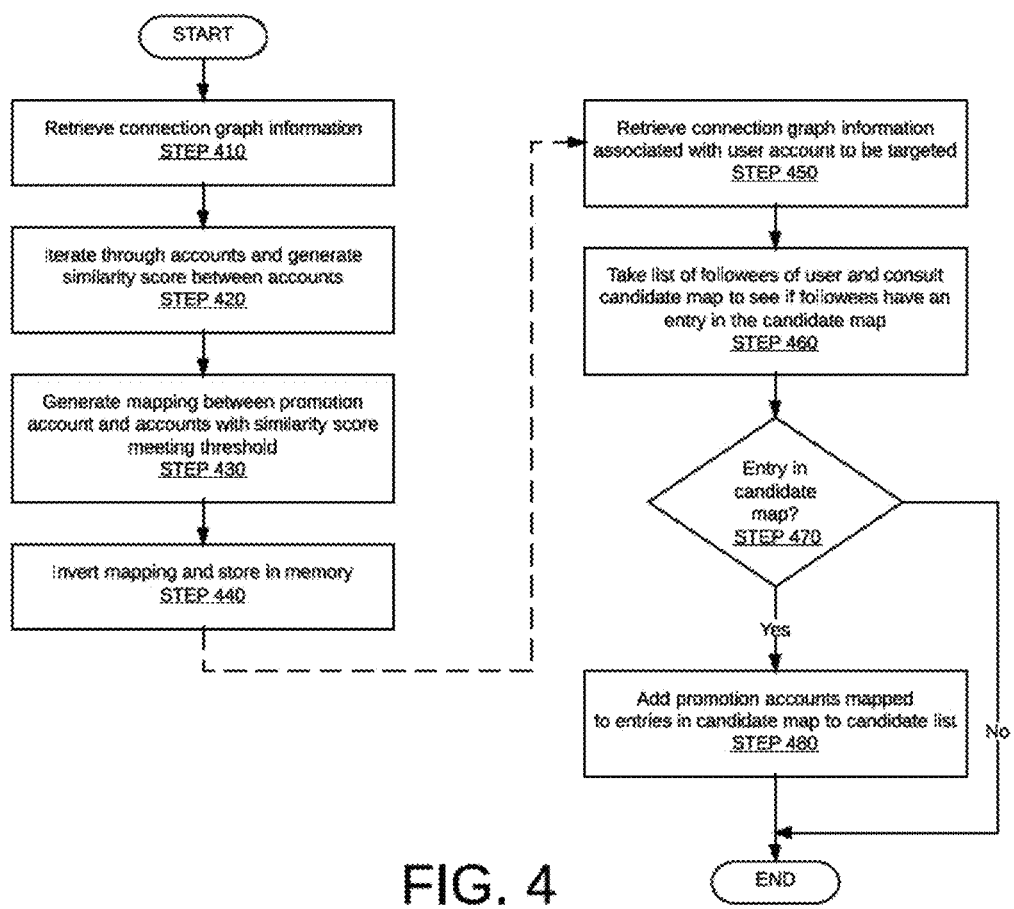
FIGS. 4 and 5 are flowcharts of targeting processing performed by the promotion module in accordance with embodiments of aspects of the invention.

FIG. 4 is a flowchart of processing performed by the promotion module 120 using implicit targeting, in accordance with an embodiment of an aspect of the invention. The promotion module 120 maintains a candidate map between a promotion account and other accounts similar to the promotion account. In FIG. 4, steps 410 through 440 are performed, preferably by an offline process, to generate the candidate map. At step 410, the promotion module 120 accesses the connection graph repository 142 and retrieves connection graph information on various accounts in the messaging platform. At step 420, the promotion module 120 iterates through the accounts and generates a similarity score between accounts, e.g., based on a cosine similarity function, where the vectors are vectors of follower connections in the connection graph. The promotion module 120 can use any of a number of techniques for determining similarity, such as a random walk technique or a Jaccard similarity coefficient. The similarity score can be based on other information, such as engagement metrics for each account. At step 430, the promotion module 120 can use a score threshold to generate a mapping between the promotion account and accounts with a similarity score meeting the score threshold. At step 440, the promotion module 120 can invert the mapping for efficient lookup and store the mapping in memory as the candidate map. The candidate map, accordingly, would contain entries for different accounts mapped to promotion accounts. Alternatively, the candidate map can associate the different accounts to promotions associated with a promotion account.

In FIG. 4, steps 450-480 are performed by the promotion module 120 as part of the candidate selection step 310 depicted in FIG. 3. The promotion module 120 uses the candidate map constructed in steps 410-440 to select the candidate promotions. At step 450, the promotion module 450 retrieves connection graph information associated with the particular user account for which promoted content is to be targeted. At step 460, the promotion module 120 takes a list of followees for the user account from the connection graph information and consults the candidate map to see if the followees have an entry in the candidate map. If the followee has an entry in the candidate map, at step 470, the promotion module at step 480 adds the promotions associated with promotion accounts identified in the candidate map to the set of possible candidate promotions. The promotion module 120 passes the collection of candidate promotions identified in the targeting steps to the filtering steps for further processing.

In accordance with another embodiment, the above approach can be generalized to allow a promoter to specify an account to target. The targeted account is utilized instead of the promotion account above to generate the candidate promotions. The promoter can specify a set S of accounts, with the intention of targeting promotions to followers of accounts in S or their lookalikes. With reference to FIG. 4, at steps 410 to 440, the promotion module would, for each targeted account, generate a list of accounts following the targeted accounts and add in accounts similar to the accounts following the targeted accounts, in accordance to the similarity metric. The above embodiment of implicit targeting can be seen as the special case where S is the promotion account.

In one embodiment, the promotion module 120 uses a form of explicit keyword targeting to select candidate promotions. For example, a promoter can specify through the promotion frontend module 115 one or more keywords. The keywords can be free-form textual keywords or can be selected from a list of possible keywords. The keywords can be selected from a more formal taxonomy of interest categories. The promotion module 120 takes the keywords and generates a candidate map that associates accounts in the messaging platform with keywords in promotions. The associations between accounts and keywords can be generated using any of a number of signals, including the connection graph, user-specified information regarding the account, and an analysis of the messages associated with the account.

Figure 5:
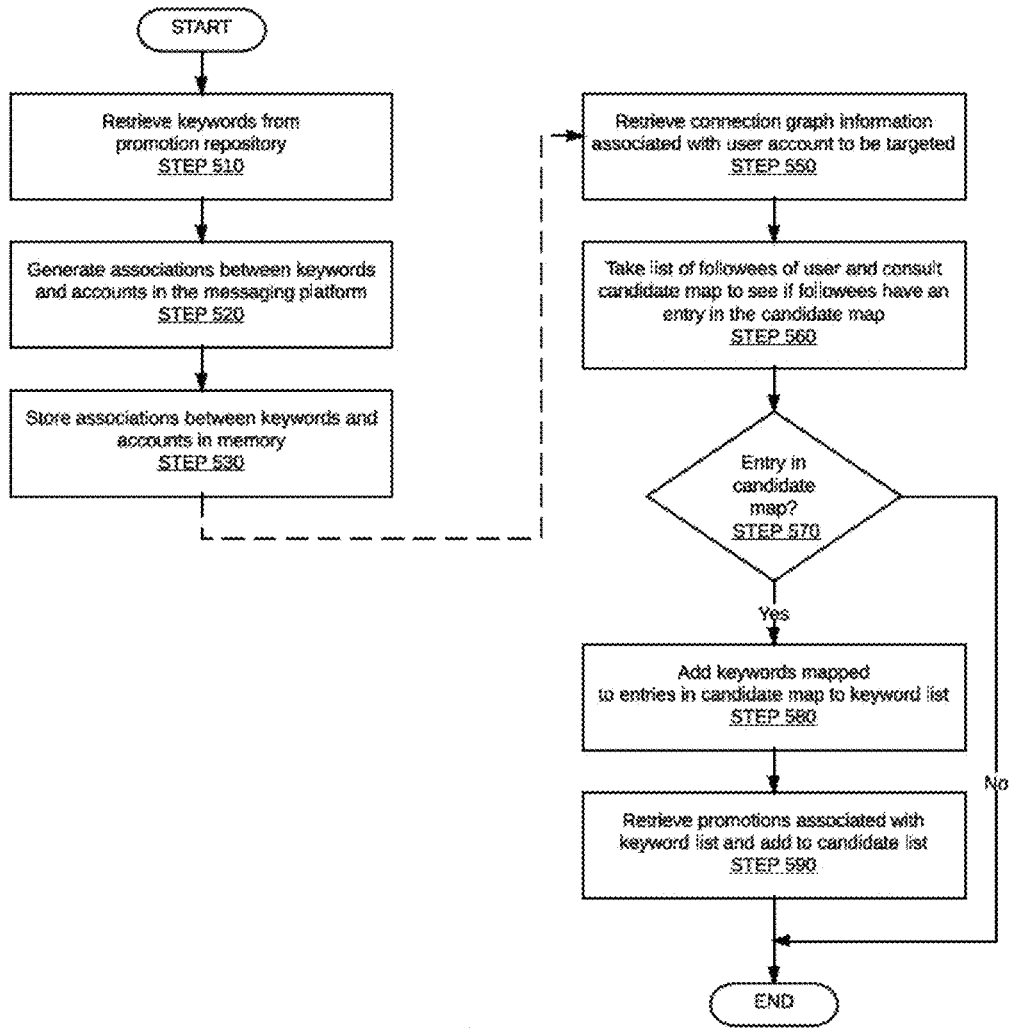

FIG. 5 is a flowchart of processing performed by the promotion module 120 using this form of explicit keyword targeting, in accordance with an embodiment of an aspect of the invention. The promotion module 120 maintains a candidate map between a promotion account and keywords associated with the promotion account. In FIG. 5, steps 510 through 540 are performed, preferably by an offline process, to generate the candidate map. At step 510, the promotion module retrieves keywords associated with different promotions from the promotion repository 148. At step 520, the promotion module 120 generates associations between accounts in the messaging platform and the keywords. The associations can represent, for example, how authoritative a person is regarding a subject or topic of interest. The associations can be inferred from the connection graph information and from user-specified information regarding the account (such as a bio specified for the account or user-provided tagging or lists associated with groups of accounts) and from an analysis of the messages associated with the account. At step 530, the associations between the accounts and the keywords are stored in the candidate map. Alternatively, the candidate map can directly associate the accounts with one or more promotions or promotion accounts which specify the associated keyword.

In FIG. 5, steps 550-580 are performed by the promotion module 120 as part of the candidate selection step 310 depicted in FIG. 3. The promotion module 120 uses the candidate map constructed in steps 510-530 to select the candidate promotions. At step 550, the promotion module 450 retrieves connection graph information associated with the particular user account for which promoted content is to be targeted. At step 560, the promotion module 120 takes a list of followees for the user account from the connection graph information and consults the candidate map to see if the followees have an entry in the candidate map. If the followee has an entry in the candidate map, at step 570, the promotion module at step 580 adds the keywords associated with the accounts to a set of possible candidate keywords. At step 590, the promotion module 120 retrieves promotions associated with the candidate keywords and passes the collection of candidate promotions identified in the targeting steps to the filtering steps for further processing.

In another embodiment, the promotion module can target based on other signals, including, without limitation, the text in messages, including links and special keywords in messages such as hashtag text. The text can be in messages composed by a user as well as text consumed by the user, in a stream associated with the user's account. The promotion module can take into account interactions between users in the messaging platform, such as replies and engagement or interaction with a message associated with another account. The promotion module can take into account the time of messages, especially when associated with an event. The promotion module can take into account of other information associated with a user, such as user-supplied text, demographic information, their geographic location or changes in their geographic location.

At step 320 in FIG. 3, the promotion module 120 performs filtering on the candidate promotions. In accordance with different embodiments of different aspects of the invention, the promotion module 120 can utilize any of a number of different filtering techniques. For example, the promotion module 120 can perform request-level filtering, campaign-level filtering, and promotion-level filtering. At request-level filtering, the promotion module 120 decides whether to serve a promotion in response to a particular user account request. At campaign-level filtering, the promotion module 120 employs one or more filters at the campaign level, which may or may not include more than one promotions. At promotion-level filtering, the promotion module 120 decides whether or not to display a promotion at the level of each individual unit of promoted content.

In one embodiment, the promotion module 120 applies request-level filters such as a stream frequency filter, to ensure that more than a certain number of promotions are not displayed in a user stream for a given period of time. In another embodiment, the promotion module 120 applies an impression limit filter, to ensure that too many promotions are not displayed in too many requests based on fatigue policies, as further discussed below. In one embodiment, the promotion module 120 applies filters based on characteristics of a campaign associated with the promoter. For example, and without limitation, the promotion module can apply filters based on keywords, based on limitations on a campaign spend, based on geographic limitations associated with the campaign, and other information associated with the campaign. In one embodiment, the promotion module 120 applies filters based on characteristics of a specific promotion, including text associated with the promotion. The filter can be based on other information associated with the promotion, such as its score in the prediction model, as further described below. The promotion module 120 can apply filters based on characteristics of the user targeted, such as whether the user has blocked other accounts.

In one embodiment, the promotion module 120 filters out candidate promotions based on user fatigue thresholds. A user, depending on the promoted content, can respond positively to the content (by engaging with the content) or negatively to the content, especially if too many promotions appear or the content itself is not engaging to the user. In accordance with one embodiment, the promotion module 120 can filter out candidate promotions based on thresholds reflected in a fatigue map 260. For example, the promotion module 120 can use the fatigue map 260 to filter out candidate promotions where the particular user account has reached a frequency threshold. For example, a cap can be placed on the number of times a particular promoter or promotion can appear in a particular display location during a particular time period. A cap can be placed on the number of time periods a particular promoter or promotion can appear in a particular display location. A minimum time period between promotions by the same promoter or all promoters can be set. A maximum number of distinct promoters or promotions can be set for a particular time period. The promotion module 120 can construct the fatigue maps 260 using an offline process 280. The fatigue maps 260 can keep track of which promotions by which promoters have been presented to which user accounts, for example, over a particular time period. In one embodiment, the fatigue map can be implemented as a data structure that associates a particular account with a list of promotions presented to the account, including the number of times the promotion has been presented, and the last time the promotion was presented. In accordance with another embodiment, the promotion module 120 can use a fatigue model to select whether to filter a promotion, where the model is based on user behavior. The model can take into account this particular user's behavior towards promoted content, e.g., whether the user avoids and tries to dismiss promoted content, or whether the user engages with promoted content. The fatigue model can also take into account the nature of the particular promotion, and the model can be tuned based on user's responses to different promoted content. For example, the model can take into account whether a user has dismissed this type of promotion before or whether the user has engaged with this type of promotion before.

In FIG. 3, at step 330, the promotion module 120 generates a prediction model score for the promotion, based on a model predicting a user's engagement with or interest in the promotion. The promotion module 120 preferably uses a score based on a probability of engagement with the promotion, such as a predicted click-through rate (pCTR). As an example, and in one embodiment, the promotion module 120 can use a prediction model that generates a content resonance score, as disclosed in co-pending commonly-assigned U.S. Utility patent application Ser. No. 13/433,217, entitled "Content Resonance," filed on Mar. 28, 2012, the contents of which are incorporated by reference herein. The prediction model can be based on counting historical features, such as a number of times that the promotion was clicked or a number of times that the promotion has been dismissed. The prediction model can include additional features, such as temporal features such as fatigue, and geographic features, such as where the particular user is located.

In another embodiment, the promotion module 120 can use a more sophisticated model, for example, based on machine learning or other advanced classification techniques. For example, the promotion module 120 can use a logistic regression model, using an advantageous metric such as relative cross-entropy (RCE). In another embodiment, the promotion module 120 can support multiple models, which are automatically selected based on some performance metric.

In FIG. 3, at step 340, the promotion module 120 ranks the promotions, at least in part using the above prediction model scores. The promotion module 120 preferably uses an auction model to select the set of promotions to provide back to the frontend module 110.

In one embodiment, the promotion module 120 ranks the promotions in part based on the prediction model score and in part based on a bid specified by the promoter as part of the auction model. The promoter can specify the auction bid in a promotion campaign through the promotion client 102 interacting with the promotion frontend module 115. In one embodiment, the system provides the promoter with bid guidance for selecting a bid for a promotion. A minimum and maximum bid can be generated from the specified budget, the time period of the promotion, as well as take into account factors such as previous bid performance. For each candidate promotion, the promotion module 120 can generate a rank score, for example, based on a combination of the bid and a quality score based on the prediction model score. For illustration purposes, the rank score can be generated based a combination of the bid, a quality score based on the prediction model score, and other historical features, such as a positive metric reflecting a probability of a positive engagement and a negative metric reflecting a probability of a negative engagement. It is preferable to include tunable parameters with each of the different factors combined in the rank score. It would also be advantageous to add other quality signals, such as spam and fraud signals.

The promotion module 120 sorts the candidate promotions by their rank score, after filtering out any promotions whose rank score falls below some threshold. The promotion module 120 can then select the candidate promotion winning the auction, for example, as the candidate promotion with the highest rank score. The promotion module 120 can run the auction in a number of ways. For example, and without limitation, the promotion module 120 can use the bid of the winning candidate promotion as a charge against the budget of the promoter account or, alternatively, the promotion module 120 can use a more sophisticated auction model, for example, using a second-price auction model, where, for each engagement, the winning promotion is charged the minimum bid it would have taken to win the auction. In one embodiment, the promotion module 120 takes into account the quality score, for example, by charging a combination of the bid of the runner up in the auction with the runner up's quality score and the quality score of the promoter. In one embodiment, the promoter would be charged:

$$\frac{(\text{bid of runner up} * qualityScore \text{ of runner up})}{(\text{its own } qualityScotre + 0.01)}$$

In other words, the rationale for the second-price auction model is that the winner of the auction is charged just enough to beat the runner up in the auction process. In the absence of a runner up, e.g., where there is only one candidate promotion in the auction, the promoter can be charged a different amount per engagement based on a combination of a reserve value and the quality score. It should be noted that the promotion module 120 can utilize any of a number of other known auction models as well.

In one embodiment, the bid should be higher than a reserve value, or the bid in combination with the quality score should be higher than a reserve value in order to participate in the auction. In accordance with another embodiment, the reserve price can be used as an additional filter on the display of the promoted content and can be calibrated depending on characteristics of the user. For example, a user account can be assigned a higher reserve value where the user is particularly prominent or influential. The accounts in the messaging platform can be assigned a score, for example, depending on their connection graph information and other aspects of their usage of the messaging platform. The reserve value, as determined for a particular auction, can then be set in accordance with the score assigned to the account being targeted by the promotion. Where the promotion bid is set to a value that, in combination with the quality score, is lower than the reserve value determined by the score assigned to the user, the promotion will not be considered for that user.

In accordance with an embodiment, the promotion module can be configured to automatically select messages associated with a promotion account for promotion, rather than being specified by the promoter manually. The promotion module 120 can retrieve a set of messages from the promotion account, such as the N most recent messages, and then score each message in accordance with how well the message resonates with users in the messaging platform. For example, and without limitation, a resonance metric based on a combination of count of clicks and/or other engagement events (such as replies, favorites, and republication of the message) with the message with a measure of the temporal recency of the message can be used to score the message. It can be advantageous to take an integer log of the score to make the scores of different messages more comparable. The message or messages with the highest score can then be promoted, as described above.

In accordance with another embodiment, the promotion module 120 can utilize a more sophisticated mechanism to score and rank messages, such as a one based on a prediction model that takes into account the particular promotion account's targeting parameters. The promoter could be given choices for constraining the selection of messages, such as messages which link back to the promoter's site or messages that contain certain text such as a hashtag. The promoter could be provided with a mechanism to favor messages that are more recent or that have another type of pre-defined characteristic. The promotion frontend module 115 can be configured to provide the suggested messages to the promoter for manual selection prior to adding the messages to a promotion. Alternatively, the promotion module 120 can be configured to select messages on a periodic basis dynamically for any given promotion.

In accordance with another embodiment, the promotion frontend module 115 provides a reach estimation to the promoter as part of the interface on the client 102. The reach estimation is an estimate of the potential audience in the messaging platform seeing promoted content. The reach estimation, in one embodiment, can be generated as follows. For each targeting criteria, an estimate is stored of all accounts in the messaging platform that match that criteria, for example, using a sampled set of all of the accounts. The intersection and unions between these sets can be used to generate the reach. For a prior time period, the prediction model scores for a promoter can be averaged and used to generate an approximate set of users that would match a particular targeting criteria given a particular bid. The system can refine these estimates as actual performance results on a promotion are returned.

In one or more embodiments of the invention, one or more steps of the flowcharts are repeated concurrently by multiple threads. Thus, one or more of the steps can be performed serially, in parallel, and/or by a distributed system, in accordance with various embodiments of the invention.

Content Resonance

System Environment

Figure 6:
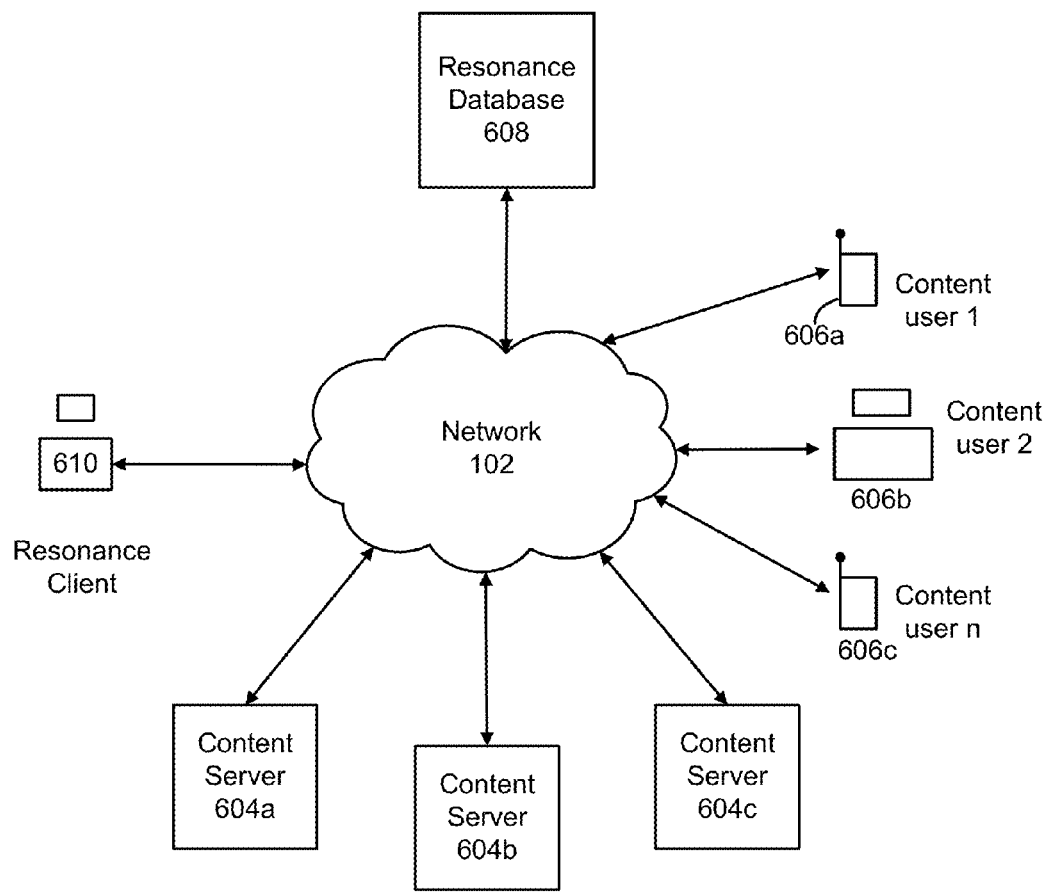
FIG. 6 is a block diagram illustrating a computing environment for determining the content's resonance according to one embodiment of the present disclosure.

Referring to FIG. 6, the computing environment for determining the content's resonance comprises content servers 604*a-c*, resonance database 608, content user clients 606*a-c* and network 602. The concept of a content's "resonance" is a new concept introduced herein which classifies content in accordance with a combination of user engagement events as modified to reflect the temporal structure of the user engagement events, as further described herein. The served content's resonance can be considered an indicator of how well the content has resonated with its intended users. As further described herein, the resonance can be based on various factors like how and when the users interact with the served content.

The computing environment can include resonance client 610. The resonance client 610 is a computing device with a processor and a memory capable of providing a graphical user interface for requesting and viewing the served content's resonance. An example computing device is described with respect to FIG. 6.

Each of the content user clients 606*a-c* (collectively referred to as "content user client 606") is a computing device with a processor and a memory that provides users with an interface to receive and interact with content. Examples of clients 606 include a desktop, a laptop and a handheld computing device. An example computing device is described with respect to FIG. 6.

Each of the content servers 604*a-c* (collectively referred to as "content server 604") is a computing device with a processor and a memory that receives requests for content from various content user clients 606 and transmits the content to the requesting clients 606. An example computing device is described with respect to FIG. 11. Additionally, the content server 604 tracks how and when a user interacts with the received content and determines the content's resonance based on the tracked information. For example, the content server 604 determines when a first user through client 606*a* hovers over an embedded link in the received content. Based on the particular time and the particular action of the first user, the content server 604 determines the content's resonance. Next, the content server 604 repeats the same process when a second user clicks on the embedded link or performs another action on the content through client 606*b*. The content server 604 is described further below.

The resonance database 608 is a computing device with a processor and a memory that stores information shared by content servers 604 collectively. The content servers 604 operate collectively to serve a large number of clients 606. In one embodiment, each content server 604 individually determines the content's resonance based on the type and time of user interaction recorded by the individual content server 604. These individual determinations distribute the load and avoid the latencies associated with a central entity collecting all the necessary data and determining the resonance value accessed by all content servers 604. However, such individual determinations require a content server 604 to also account for type and time of user interactions being recorded by other content servers 604. The resonance database 608 stores information that assists the content servers 604 to individually determine resonance values and also account for type and time of user interactions being recorded by other servers.

Examples of such information include an impression total representing the combined total number of times an impression of a content file is viewed by various users through their clients 606, the impression update time when the impression total was last updated by a content server 604, a positive interaction total representing the total number of times the users have interacted with the content beyond just viewing the content, and the interaction update time when the positive interaction total was updated by a content server 604.

In one embodiment, every time a content server 604 reads the impression total and the positive interaction total from the resonance database 608, the content server 604 decays the read totals. Such decayed totals beneficially give more weight to the current impression and positive interaction as compared to the previous impressions and interactions. Accordingly, every time these totals are read, the totals are first decayed based on the amount of time passed since the last update. The decayed totals are then updated to account for the new impression or positive interaction. These updated totals and their time of update are then written by the content server 604 to the resonance database 608. This information is read and updated by various content servers 604 to keep the content servers 604 synchronized with each other. The use of this information in synchronizing the content servers 604 is described further below.

The network 602 represents the communication pathways between the resonance client 610, content servers 604, content user clients (or client systems) 606 and resonance database 608. In one embodiment, the network 602 is the Internet. The network 602 can also use dedicated or private communications links that are not necessarily part of the Internet.

Operational Overview

An originating user uploads content, views content and transmits content to two other users through a messaging service or another application on content user client 606*a*. The content server 604*a* tracks the originating user's interaction with the content and the content server 604*b* tracks the two recipient's interaction with the received content. When the originating user views and forwards the content through user client 606*a*, the originating client 606*a* transmits data to the content server 604*a* indicating that the originating user has viewed and forwarded the content. The content server 604a receives the data, determines the time the originating user forwarded the content, and determines the content's resonance based on the forwarding action.

To determine resonance, the content server 604a reads the positive interaction total, the interaction update time, the impression total and the interaction update time from the resonance database 608. Because the originating user is the first to view the content and perform a positive action, i.e., an action other than viewing the content, all the values read from resonance database 608 are zero. The content server 604a next decays the read totals. Because the read totals are at their respective minimums, decaying them does not change their value. The content server 604a increments the impression total by one and the positive interaction total by the action weight associated with the forwarding action. Additionally, the content server 604a updates the impression update time and interaction update time to reflect the time of current update. Next, the content server 604a writes the updated values to the resonance database 608.

In one embodiment, the content server 604a maintains a local copy of the updated totals. These local copies are used to determine the content's resonance. For example, the content server 604a uses the local copies of the totals to determine the content's resonance in response to receiving a request for content's resonance from resonance client 610. The local copies beneficially enable a content provider to determine the content's resonance without fetching the values from a central database and thus avoiding latencies involved with accessing and retrieving data. In another embodiment, the content server 604a does not maintain the local copies and fetches the totals from the resonance database 608 whenever the content server 604 determines the content's resonance.

Regardless of how the content server 604a determines the content's resonance, the content server 604a forwards the content to its two intended users (or recipients). The first intended recipient views the content through client 606b some time, for e.g. five minutes, after the originating user forwards the content. The first intended recipient views the content and performs no further action on the content. The client 606b transmits data to content server 604b indicating that the first recipient has interacted with, e.g., viewed or selected, the content. The content server 606b receives the data, retrieves the positive interaction total, the impression total, and their respective update times from resonance database 608. Next, the content server 606b decays the two retrieved totals based on the amount of time, e.g. five minutes, elapsed since the last update made to the totals. The decayed impressions total is then increased by one and the positive interaction total is not increased any further because the first intended recipient did not perform a positive action on the content. The content server 604b then writes the decayed and updated values along with their respective update times to the resonance database 608.

After another time interval, e.g. two minutes, the second intended user interacts with, e.g. selects or views, the content sent by the originating user and replies to the originating user through client 606c. The client 606c transmits data to content server 604b indicating the second recipient's action. The content server 604b then performs similar steps as described above for the first recipient above. However, unlike the first recipient, the second recipient has performed a positive action of replying based on the received content. Accordingly, the positive interaction total is updated by the weight associated with the replying action.

In this manner, the content servers 604 beneficially account for various users' interaction with the content when determining the content's resonance. Additionally, the content servers 604 do not account for only the total number of user interaction but also weigh different user interactions differently. Moreover, in one embodiment, the content servers 604 also beneficially account for the recency of an interaction. The more recent a user's interaction with the content, the more weight it is given in determining the content's resonance.

Upon reading this disclosure, one of ordinary skill in the art will understand that the description above includes two content servers 604 for the purposes of illustration. In other embodiments, one content server 604 can serve content to and track interactions of various users. In such embodiments, the content server 604 does not synchronize with other servers. Accordingly, the content server 604 does not store in or retrieve from the resonance database 608 the above mentioned information and instead maintains copies of such information in local memory.

Content Server 604

Figure 7:
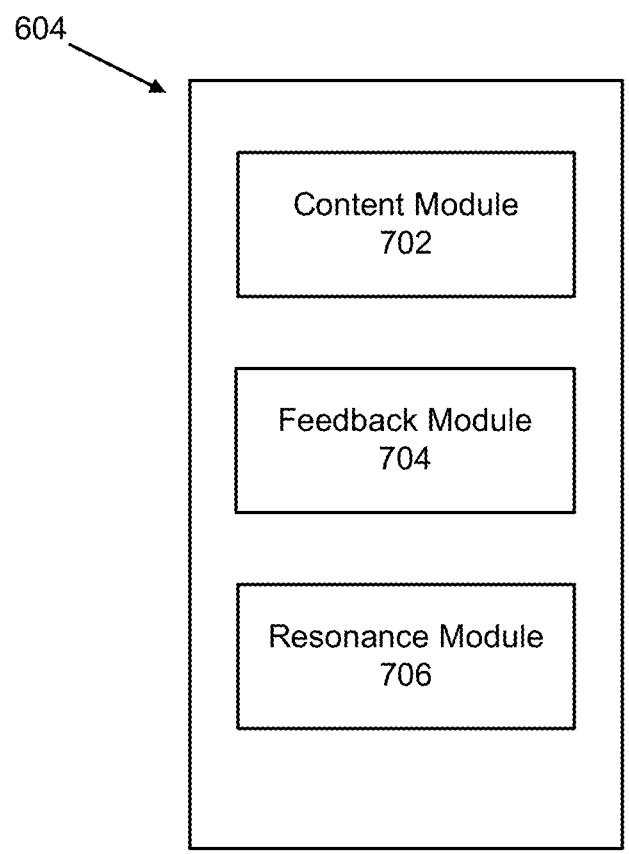
FIG. 7 is a block diagram illustrating a content server according to one embodiment of the present disclosure.

FIG. 7 is a block diagram illustrating the content server 604 according to one embodiment of the present disclosure. The content server 604 comprises a content module 702, a feedback module 704 and a resonance module 706.

The content module 702 receives request for the content from client 606 and transmits the requested content to client 606. Additionally, the content module 702 also receives from client 606a a request to forward the content to client 606b. Accordingly, the content module 702 determines the content server 604 associated with client 606b and forwards the request to the determined content server 604. The content module 702 in the determined content server later transmits the forwarded content to client 606b.

The feedback module 704 communicates with client 606 to determine whether the content's impression was rendered on client 606, to determine the action performed by a user on the received content and to determine the time the action was performed. Examples of user actions includes hover view (i.e., moving the cursor over a link or another part of the content), hashtag click (i.e., adding context data or metadata for the content), URL click (i.e., selecting a link in the content), profile click (i.e., selecting a link to view the content's sender's profile), forwarding the content to other users, replying to the content sender, marking the received content as favorite, and/or subscribing to the sender's profile to receive additional messages from the sender.

Figure 8:
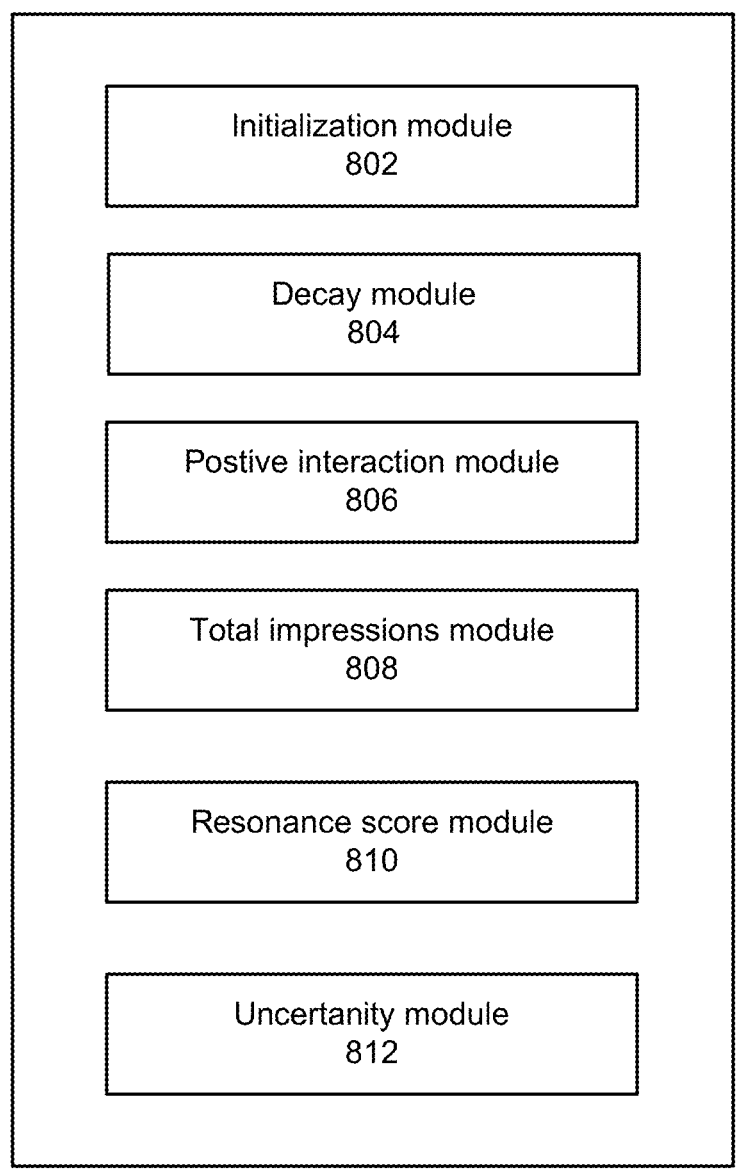
FIG. 8 is a block diagram illustrating a resonance module according to one embodiment of the present disclosure.

The resonance module 706 determines the content's resonance. Optionally, the resonance module 706 updates the resonance database 608 in embodiments where the content server 604 synchronizes with other content servers 604. Referring to FIG. 8, the resonance module 706 comprises an initialization module 802, a decay module 804, a positive interaction module 806, a total impressions module 808, a resonance score module 810 and an uncertainty module 812.

The initialization module 802 determines whether users have previously interacted with content. If not, the initialization module 802 initializes for the content various values like positive interaction total, interaction update time, impression total and impression update time. The initialization module 802 queries the resonance database 608 to determine whether these values exist for the content. If not, the initialization module 802 initializes these values. In one embodiment, the initialization module 802 initializes all these values to zero.

The decay module 804 retrieves from the resonance database 608 the positive interaction total, interaction update time, impression total and impression update time. Next, the decay module 804 adjusts or decays (i.e., dilutes) the positive interaction total based on the current time and the interaction update time. Similarly, the decay module 804 adjusts or decays the impression total based on the current time and the impression update time. In one embodiment, the decay module 804 decays the impression total according to the following formula:

$$m_{updated}=m_{prev}.e^{(-a(t-y))},$$

wherein $m_{updated}$ is the updated impression total, a is a constant, t is the current time, and y is the impression update time. Similarly, in one embodiment, the decay module 804 decays the positive interaction total according to the following formula:

$$r_{updated}=r_{prev}.e^{(-a(t-x))},$$

wherein $r_{updated}$ is the updated positive interaction total, a is a constant, t is the current time, and x is the interaction update time.

The positive interaction module 806 updates the decayed positive interaction total based on the positive interaction tracked by the feedback module 204. After updating the positive interaction total, the positive interaction module 806 writes the updated total and the update time to the resonance database 608.

To update the decayed positive interaction total, the positive interaction module 806 queries the feedback module 204 and determines the type of interaction the user has committed with the content. Based on the determined interaction type, the positive interaction module 806 assigns an action weight to the interaction. The positive interaction module 806 retrieves the decayed positive interaction total from the decay module 804 and increments the decayed total by the action weight corresponding to the interaction.

In one embodiment, the positive interaction module 806 assigns an action weight to an interaction based on the level of user's interaction with the content. The more the interaction the greater the weight. For example, the positive interaction module 806 may define four types of weights: curiosity weight, awareness weight, intent weight and engagement weight. Amongst these four types of weight, in one embodiment, the engagement weight is the greatest, followed by intent weight, awareness weight and then curiosity weight. The interaction module 806 may assign hover view action curiosity weight and hashtag click action awareness weight. The positive interaction module 806 may also assign intent weight to URL click, profile click and screen name click. Additionally, actions like replying to the content's sender, marking the content as favorite or forwarding the content may be assigned an engagement weight by the positive interaction module 806. Such assignment of different levels of weight to different actions is beneficial in determining the content's resonance because such weight assignments account for the amount of engagement a particular user displays with the content.

After the decayed positive interaction total is incremented with appropriate action weight, the incremented total is used to determine the content's resonance as described below. Additionally, the positive interaction module 806 updates the resonance database 608 with the updated total. The positive interaction module 806 also updates the interaction update time as the current time in the resonance database 608. The updated positive interaction total and interaction update time beneficially enable various content servers 604 to synchronize with each other. The updated total and update time is later read by a positive interaction module 806 in another content server 604. The other content server 604 updates the read total and time based on the positive interaction of another user tracked by that content server 604. In this manner, each content server 604 reads the value of positive interaction total from the resonance database 608 and updates the read value based on the positive interaction tracked by that particular server. Accordingly, the load of updating the positive interaction total is distributed amongst various content servers 604. Moreover, because each content server 604 reads and updates the same data variables from the resonance database 608, the positive interaction total and the interaction update time variables account for positive interactions tracked by all content servers 604 collectively.

Because each individual content server 604 determines the content's resonance based on these variables, the individually determined resonance on each server 604 accounts for the feedback from the other content servers 604. Accordingly, the determination of resonance made by each content server 604 is synchronized with the resonance determination made by other content servers 604. Although synchronized, the resonance values determined by two different content servers 604 need not be identical because each content server accounts for different positive interactions it tracks. Because the positive interactions tracked by two content servers 604 need not be identical, the resonance values determined by the two content servers need not be identical either.

The total impressions module 808 retrieves the decayed impression total from decay module 804 and updates the decayed impression total to account for the impression tracked by the feedback module 706. Next, the incremented total is used to determine the content's resonance as described below. Additionally, the total impressions module 808 updates the resonance database 608 with the updated impression total. The total impressions module 808 also updates the impression update time as the current time in the resonance database 608. Like the updated positive interaction total and the interaction update time, the updated impression total and impression update time enable content servers to synchronize with each other.

The resonance score module 810 determines the content's resonance based on the decayed and updated positive interaction total and impression total. In one embodiment, the resonance is determined based on the following formula:

$$s=\max\{((r+1)\div(m+2)),1\},$$

wherein s is resonance, r is the updated positive interaction and m is the updated impression total.

The uncertainty module 812 accounts for the uncertainty caused by a small dataset associated with content. If the content has not been served to a predetermined number of users, the impression total and positive interaction total are not big enough to adequately indicate the content's resonance. To counterbalance the adverse effects of small impression total and positive interaction total, the uncertainty module 810 adjusts the content's resonance based on the total number of impressions for all the content that has the same type as the content whose resonance is being determined. Content may be classified as belonging to the same type based on various criteria like keywords associated with the content. In one embodiment, the adjusted resonance is determined based on the following formula:

$$s=\max\{((r+1)\div(m+2)),1\}+(\ln(M+1)/2(m+2))^{1/2},$$

wherein s is resonance, r is the updated positive interaction, m is the updated impression total and M is the total number of impressions for all the content that has the same type as the content whose resonance is being determined.

Resonance Determination Methodology

Figure 9:
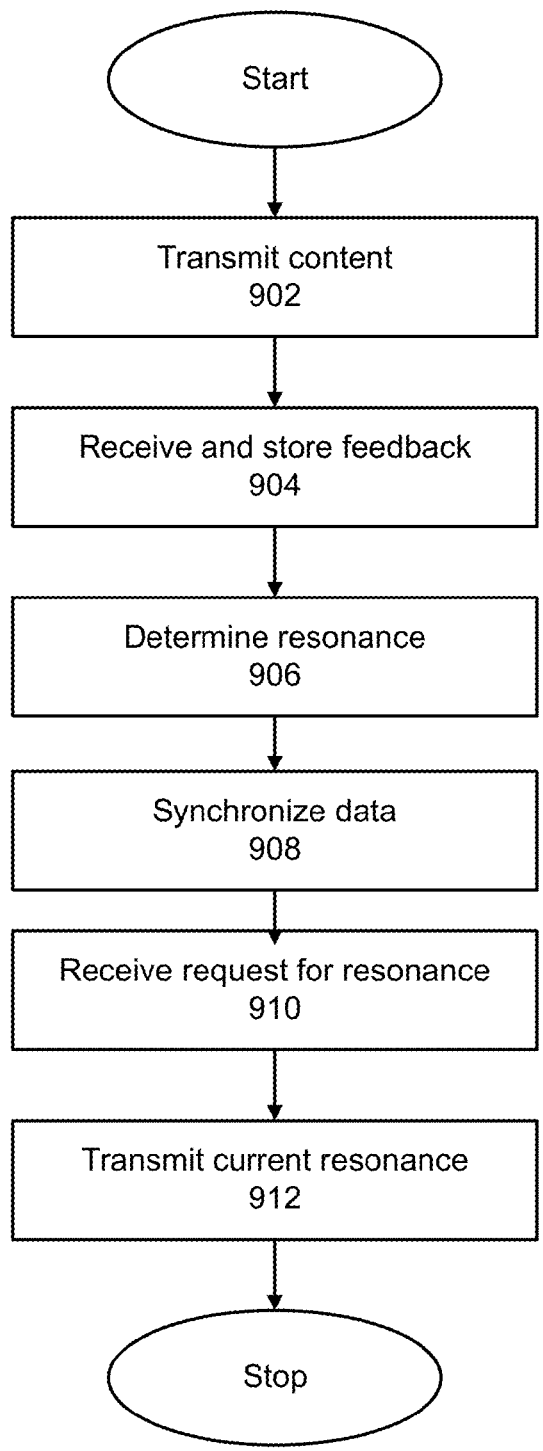
FIG. 9 is a flow diagram illustrating a method for transmitting resonance for content in response to a request for content's resonance according to one embodiment of the present disclosure.

FIG. 9 is a flow diagram illustrating a method for transmitting resonance for content in response to a request for content's resonance according to one embodiment of the present disclosure. The content server 604 transmits 902 content to content user clients 606 and receives 904 feedback regarding the users' interaction with the content. Based on the received feedback, the content server 604 updates the content's positive interaction total and impression total. The content server 604 then determines 906 the content's resonance based on the updated positive interaction total and impression total. The method for determining the content's resonance based on positive interaction total and impression total is further described below with FIG. 11. Next, the content server 604 writes 908 the updated total in resonance database 608. The content server 604 then receives 910 a request from resonance client 610 for content's resonance and the content server 604 transmits 912 the determined resonance to the resonance client.

Figure 11:
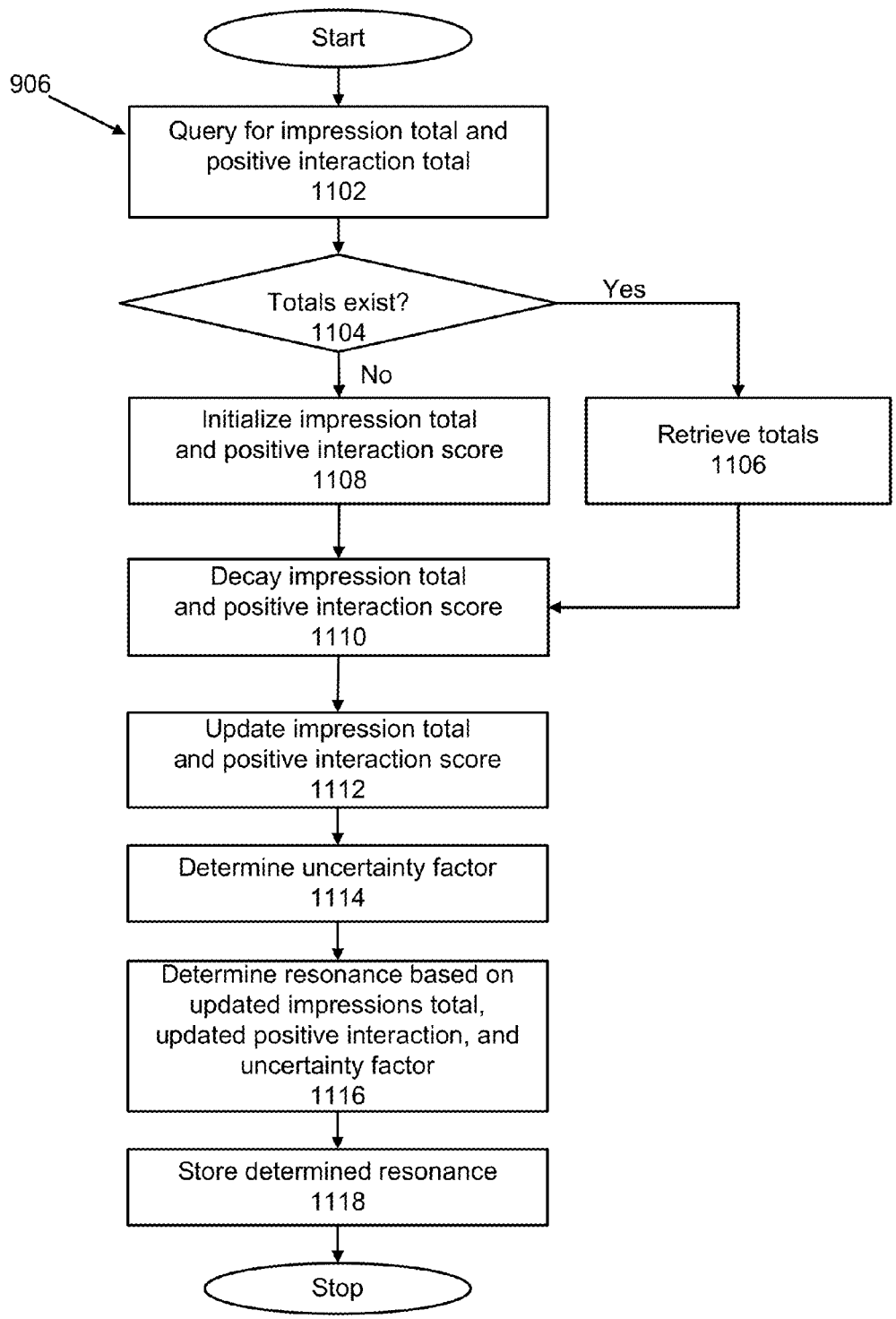
FIG. 11 is a flow diagram illustrating a method for determining resonance according to one embodiment of the present disclosure.

FIG. 11 is a flow diagram illustrating a method for determining resonance according to one embodiment of the present disclosure. The content server 604 queries 1102 the resonance database 608 and determines 1104 if the content has been previously served and if impression total and positive interaction score exist for the content. If not, the content server 604 initializes 1108 the impressions total, the positive interaction score and their respective update times. If the totals already exist, the content server 604 retrieves 1106 the totals and their respective update times. Next, the content server 604 decays 1110 the impression total and positive interaction score and then updates 1112 the impression total and positive interaction score based on the feedback received in step 404. The content server 604 determines 1114 the uncertainty factor and determines 1116 the resonance based on the updated impressions total, updated positive interaction score, and uncertainty factor. Subsequently, the content server 604 stores 1118 the determined resonance.

ADDITIONAL CONSIDERATIONS

Figure 10:
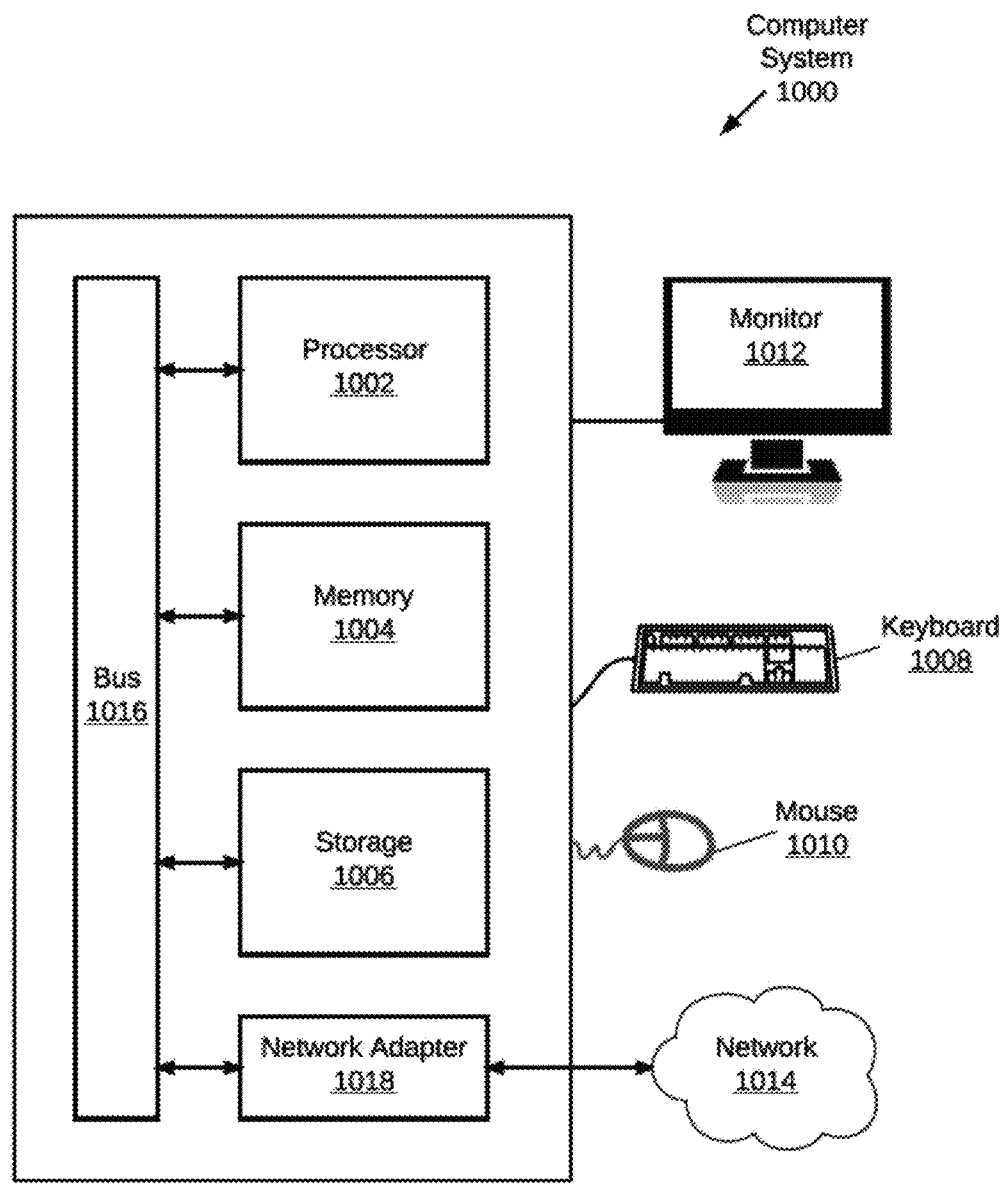
FIG. 10 is a diagram of a computer system, suitable for implementation of an embodiment of an aspect of the invention.

Embodiments of the invention, for example as described with references to FIGS. 1, 6, any other figure, or any combination thereof, may be implemented on virtually any type of computer regardless of the platform being used. For example, as shown in FIG. 10, a computer system (1000) includes one or more processor(s) (1002) (such as a central processing unit (CPU), integrated circuit, hardware processor, etc.), associated memory (1004) (e.g., RAM, cache memory, flash memory, etc.), a storage device (1006) (e.g., a hard disk, an optical drive such as a compact disk drive or digital video disk (DVD) drive, a flash memory stick, etc.), a network adapter (1018), and numerous other elements and functionalities typical of today's computers (not shown). One or more components of the computer system (1000) may be communicatively connected by a bus (1016). The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via the network adapter (1118). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, in one or more embodiments of the invention, one or more elements of the aforementioned computer system (1000) may be located at a remote location and connected to the other elements over a network. Further, embodiments of the invention may be implemented on a distributed system having a plurality of nodes, where each portion of the invention (e.g., promotion module (120), promotion frontend module (115), promotion repository (148), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., promotion module (120), promotion frontend module (115), promotion repository (148), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems and/or flowcharts, in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

One or more embodiments of the invention have one or more of the following advantages. By using message data from messages of a messaging platform as a signal for identifying music-related content, it may be possible to more accurately determine popularity of an artist and/or song. Furthermore, by utilizing a messaging data to determine popularity and/or popularity trends, it may be possible to provide more relevant music recommendations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method comprising:
receiving a request for promoted content to be presented to a user of a real-time messaging platform that publicly broadcasts streams of messages authored by the users of the platform;
selecting from a set of available promotion items a set of candidate promotion items based on the request and one or more targeted attributes of the user;
for each of the set of candidate promotion items,
providing the candidate promotion item for inclusion in one or more of the streams;
identifying in each of the streams one or more user engagement events for the candidate promotion item, each user engagement event indicating (1) an interaction between an engaging user of the real-time messaging platform and the candidate promotion item appearing in one of the streams and (2) a time when the interaction occurred,
processing the user engagement events to compute a resonance rating for the candidate promotion item, the resonance rating based on a level of engagement by the engaging users of the real-time messaging platform with the candidate promotion item, and
selecting at least one of the set of candidate promotion items for presentation to at least one other of the user in at least one other of the message streams, based on the decayed resonance ratings.

2. The method of claim 1, wherein the request includes one or more search keywords, and selecting from the set of available promotion items a set of candidate promotion items comprises identifying the set of candidate promotion items based on a candidate map that stores relationships between the one or more search keywords and the set of available promotion items.

3. The method of claim 1, wherein selecting from the set of available promotion items a set of candidate promotion items comprises:
for each of the set of available promotion items,
identifying a promotion account associated with the available promotion item,
determining, based on a connection graph that stores relationships between different users of the real-time messaging platform, whether the promotion account and the user share at least one connection, and
selecting the available promotion item as a candidate promotion item only when the user shares at least one connection with the promotion account.

4. The method of claim 1, wherein selecting at least one of the set of candidate promotion items for presentation comprises determining a number of the set of candidate promotion items to be selected for presentation based on how many promotion items have previously been presented to the user.

5. The method of claim 1, wherein selecting at least one of the set of candidate promotion items for presentation comprises:
identifying an owner of a first candidate promotion item;
determining a number of promoted items that have been previously presented to the user and are associated with the owner; and
selecting the first candidate promotion item for presentation only when the determined number is below a threshold.

6. The method of claim 1, wherein selecting at least one of the set of candidate promotion items for presentation comprises:
computing for each of the set of candidate promotion items a rank score based on the decayed resonance rating computed for the candidate promotion item and a bid amount provided for the candidate promotion item; and
selecting the at least one of the set of candidate promotion items based on relative rank scores computed for the set of candidate promotion items.

7. The method of claim 1, wherein, for a first candidate promotion item, decaying comprises decaying the resonance rating exponentially based on a difference between a first time indicated by a user engagement event and a current time.

8. The method of claim 1, wherein, for a first candidate promotion item, processing the user engagement events comprises:
analyzing the user engagement events to compute an impressions rating and a positive interactions rating associated with the first candidate promotion item; and
combining the impressions rating and the positive interactions rating to generate the resonance rating for the candidate promotion item.

9. A non-transitory computer readable storage medium storing instructions, the instructions when executed by a processor configured to cause the processor to:
receive a request for promoted content to be presented to a user of a real-time messaging platform that publicly broadcasts streams of messages authored by the users of the platform;
select from a set of available promotion items a set of candidate promotion items based on the request and one or more targeted attributes of the user;
for each of the set of candidate promotion items,
provide the candidate promotion item for inclusion in one or more of the streams;
identify in each of the streams one or more user engagement events for the candidate promotion item, each user engagement event indicating (1) an interaction between an engaging user of the real-time messaging platform and the candidate promotion item appearing in one of the streams and (2) a time when the interaction occurred,
process the user engagement events to compute a resonance rating for the candidate promotion item, the resonance rating based on a level of engagement by the engaging users of the real-time messaging platform with the candidate promotion item, and
decay the resonance rating based on the times indicated by the user engagement events; and select at least one of the set of candidate promotion items for presentation to at least one other of the user §in at least one other of the message streams based on the decayed resonance ratings.

10. The computer readable storage medium of claim 9, wherein the request includes one or more search keywords, and selecting from the set of available promotion items a set of candidate promotion items comprises identifying the set of candidate promotion items based on a candidate map that stores relationships between the one or more search keywords and the set of available promotion items.

11. The computer readable storage medium of claim 9, wherein the instructions are further configured to cause the processor to select from the set of available promotion items a set of candidate promotion items by:
for each of the set of available promotion items,
identifying a promotion account associated with the available promotion item,
determining, based on a connection graph that stores relationships between different users of the real-time messaging platform, whether the promotion account and the user share at least one connection, and
selecting the available promotion item as a candidate promotion item only when the user shares at least one connection with the promotion account.

12. The computer readable storage medium of claim 9, wherein the instructions are further configured to cause the processor to select at least one of the set of candidate promotion items for presentation by determining a number of the set of candidate promotion items to be selected for presentation based on how many promotion items have previously been presented to the user.

13. The computer readable storage medium of claim 9, wherein the instructions are further configured to cause the processor to select at least one of the set of candidate promotion items for presentation by:
identifying an owner of a first candidate promotion item;
determining a number of promoted items that have been previously presented to the user and are associated with the owner; and
selecting the first candidate promotion item for presentation only when the determined number is below a threshold.

14. The computer readable storage medium of claim 9, wherein the instructions are further configured to cause the processor to select at least one of the set of candidate promotion items for presentation by:
computing for each of the set of candidate promotion items a rank score based on the decayed resonance rating computed for the candidate promotion item and a bid amount provided by an owner of the candidate promotion item; and
selecting the at least one of the set of candidate promotion items based on relative rank scores computed for the set of candidate promotion items.

15. The computer readable storage medium of claim 9, wherein the instructions are further configured to cause the processor to, for a first candidate promotion item, decay by decaying the resonance rating exponentially based on a difference between a first time indicated by a user engagement event and a current time.

16. The computer readable storage medium of claim 9, wherein the instructions are further configured to cause the processor to, for a first candidate promotion item, process the user engagement events comprises:
analyzing the user engagement events to compute an impressions rating and a positive interactions rating associated with the first candidate promotion item; and
combining the impressions rating and the positive interactions rating to generate the resonance rating for the candidate promotion item.

17. A computer system, comprising:
a computer processor;
a promotion module configured to execute on the computer processor and to:
receive a request for promoted content to be presented to a user of the real-time messaging platform that publicly broadcasts messages authored by users of the platform,
select from a set of available promotion items a set of candidate promotion items based on the request and one or more targeted attributes of the user,
for each of the set of candidate promotion items,
provide the candidate promotion item for inclusion in one or more of the streams;
identify in each of the streams one or more user engagement events for the candidate promotion item, each user engagement event indicating (1) an interaction between an engaging user of the real-time messaging platform and the candidate promotion item appearing in one of the streams and (2) a time when the interaction occurred,
process the user engagement events to compute a resonance rating for the candidate promotion item, the resonance rating based on a level of engagement by the engaging users of the real-time messaging platform with the candidate promotion item, and
decay the resonance rating based on the times indicated by the user engagement events, and
select at least one of the set of candidate promotion items for presentation to the user based on the decayed resonance ratings.

18. The computer system of claim 17, wherein the promotion module is further configured to select from the set of available promotion items a set of candidate promotion items by:
for each of the set of available promotion items,
identifying a promotion account associated with the available promotion item, determining, based on a connection graph that stores relationships between different users of the real-time messaging platform, whether the promotion account and the user share at least one connection, and
selecting the available promotion item as a candidate promotion item only when the user shares at least one connection with the promotion account.

19. The computer system of claim 17, wherein the promotion module is further configured to select at least one of the set of candidate promotion items for presentation by determining a number of the set of candidate promotion items to be selected for presentation based on how many promotion items have previously been presented to the user.

20. The computer system of claim 17, wherein the promotion module is further configured to select at least one of the set of candidate promotion items for presentation by:
identifying an owner of a first candidate promotion item;
determining a number of promoted items that have been previously presented to the user and are associated with the owner; and
selecting the first candidate promotion item for presentation only when the determined number is below a threshold.

21. The computer system of claim 17, wherein the request includes one or more search keywords, and selecting from the set of available promotion items a set of candidate promotion items comprises identifying the set of candidate promotion items based on a candidate map that stores relationships between the one or more search keywords and the set of available promotion items.

22. The computer system of claim 17, wherein the instructions are further configured to cause the processor to select at least one of the set of candidate promotion items for presentation by:
- computing for each of the set of candidate promotion items a rank score based on the decayed resonance rating computed for the candidate promotion item and a bid amount provided by an owner of the candidate promotion item; and
- selecting the at least one of the set of candidate promotion items based on relative rank scores computed for the set of candidate promotion items.

23. The computer system of claim 17, wherein the instructions are further configured to cause the processor to, for a first candidate promotion item, decay by decaying the resonance rating exponentially based on a difference between a first time indicated by a user engagement event and a current time.

24. The computer system of claim 17, wherein, for a first candidate promotion item, processing the user engagement events comprises:
- analyzing the user engagement events to compute an impressions rating and a positive interactions rating associated with the first candidate promotion item; and
- combining the impressions rating and the positive interactions rating to generate the resonance rating for the candidate promotion item.

\* \* \* \* \*